United States Patent [19]
Rouch

[11] Patent Number: 5,398,620
[45] Date of Patent: Mar. 21, 1995

[54] LEVELING APPARATUS FOR A LEVEL SENSITIVE DEVICE

[76] Inventor: Kenneth E. Rouch, 29571 Locust Dr., Elkhart, Ind. 46516

[21] Appl. No.: 13,577

[22] Filed: Feb. 4, 1993

[51] Int. Cl.$^6$ ............................................. A47F 5/12
[52] U.S. Cl. ...................................... 108/1; 248/396; 248/188.2
[58] Field of Search ............... 108/1, 7, 147, 6, 8; 248/188.2, 188.4, 396, 372.1, 650, 649

[56] References Cited
U.S. PATENT DOCUMENTS

| | | | |
|---|---|---|---|
| 2,695,147 | 11/1954 | Castricone | 248/649 |
| 2,829,934 | 4/1958 | Schulze | 108/157 |
| 3,215,391 | 11/1965 | Storm | 248/396 |
| 3,299,498 | 1/1967 | Tomita | 248/168.4 X |
| 3,958,659 | 5/1976 | Selman | 108/7 X |
| 3,988,021 | 10/1976 | Grover | 108/1 X |
| 4,502,393 | 3/1985 | Kaiser | 108/1 |
| 4,590,865 | 5/1986 | Rutsche et al. | 108/147 X |
| 4,615,279 | 10/1986 | de la Haye | 108/7 X |
| 4,796,791 | 1/1989 | Goss et al. | 248/650 X |

*Primary Examiner*—Jose V. Chen
*Attorney, Agent, or Firm*—James D. Hall

[57] ABSTRACT

An apparatus for leveling various level sensitive devices. The leveler including a base and a tray supported on the extensible lift rods of three leveling pods. The leveling pods are responsive to the rotation of three handles located on the front side of the base for raising and lowering tray in relation to the base. The tray is biased against the lift rods by a set of four springs and carries three sight glasses for determining the tray's level position. The base has end openings for ready access to the leveling pods. The base also includes suction cups for mounting the leveler to a countertop.

23 Claims, 2 Drawing Sheets

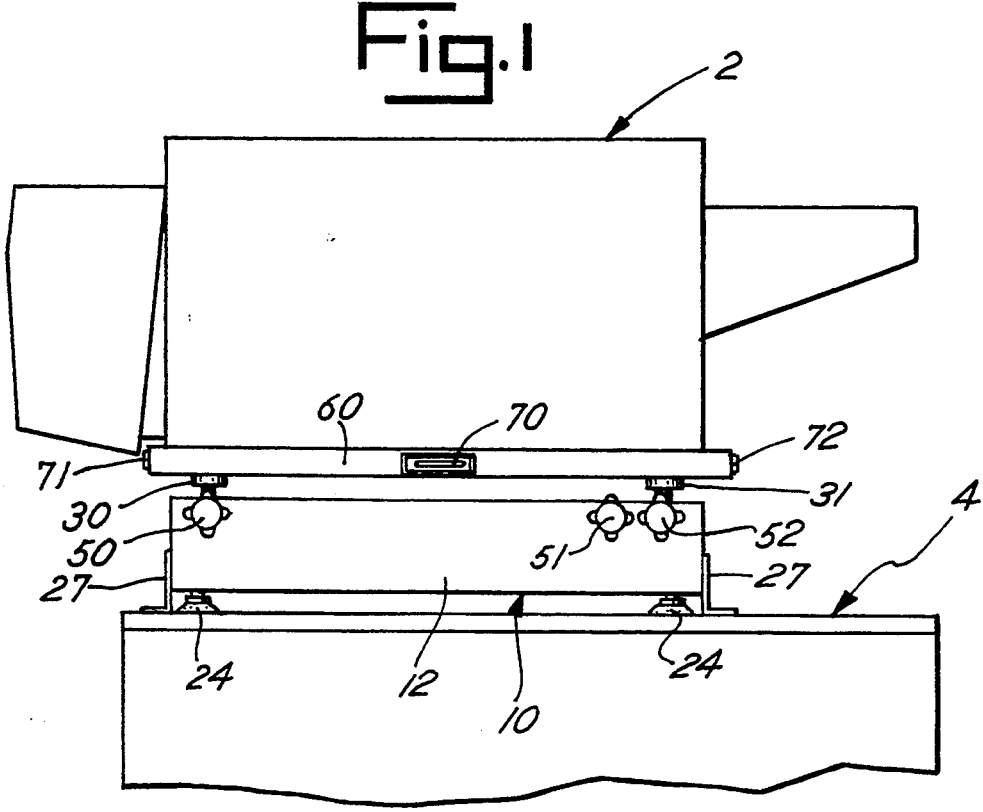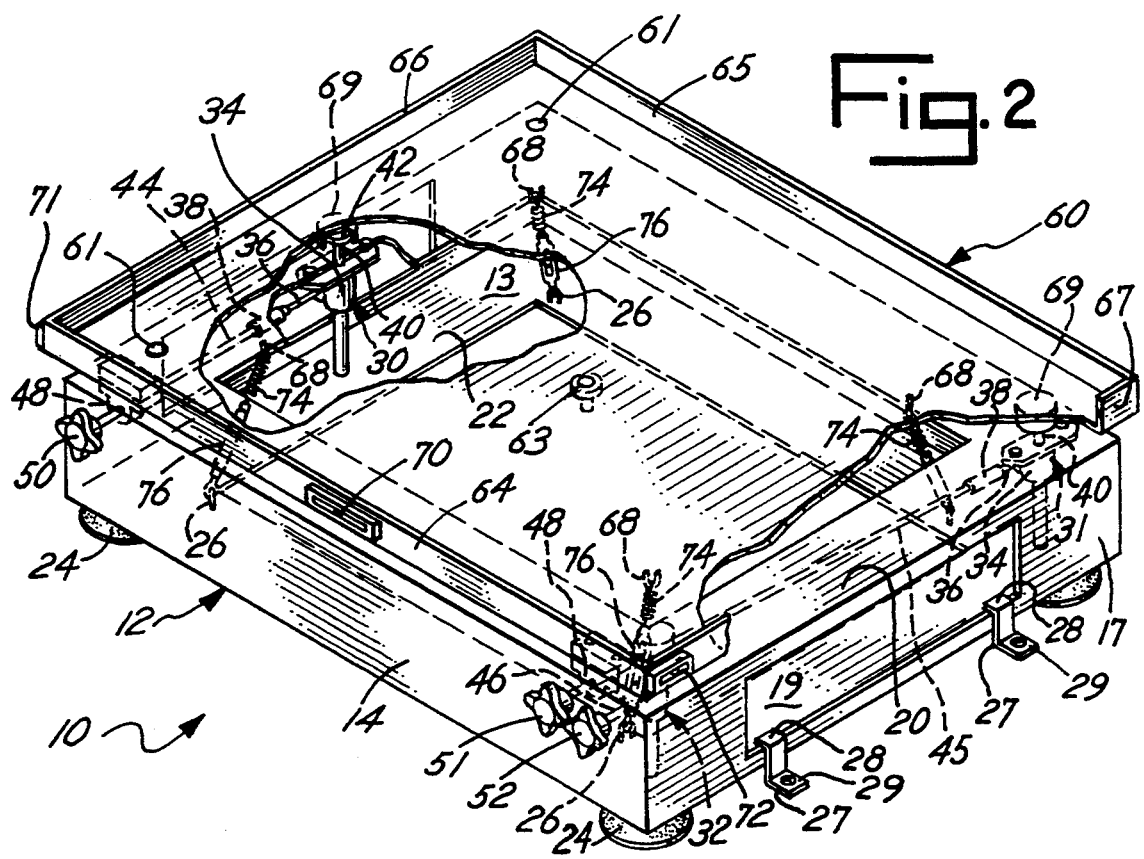

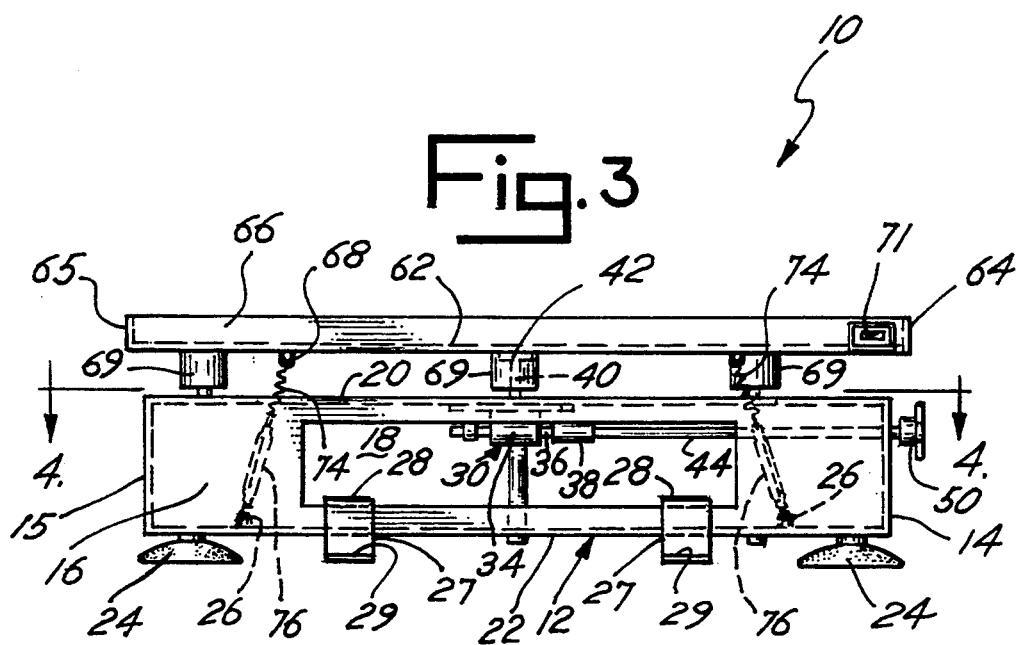
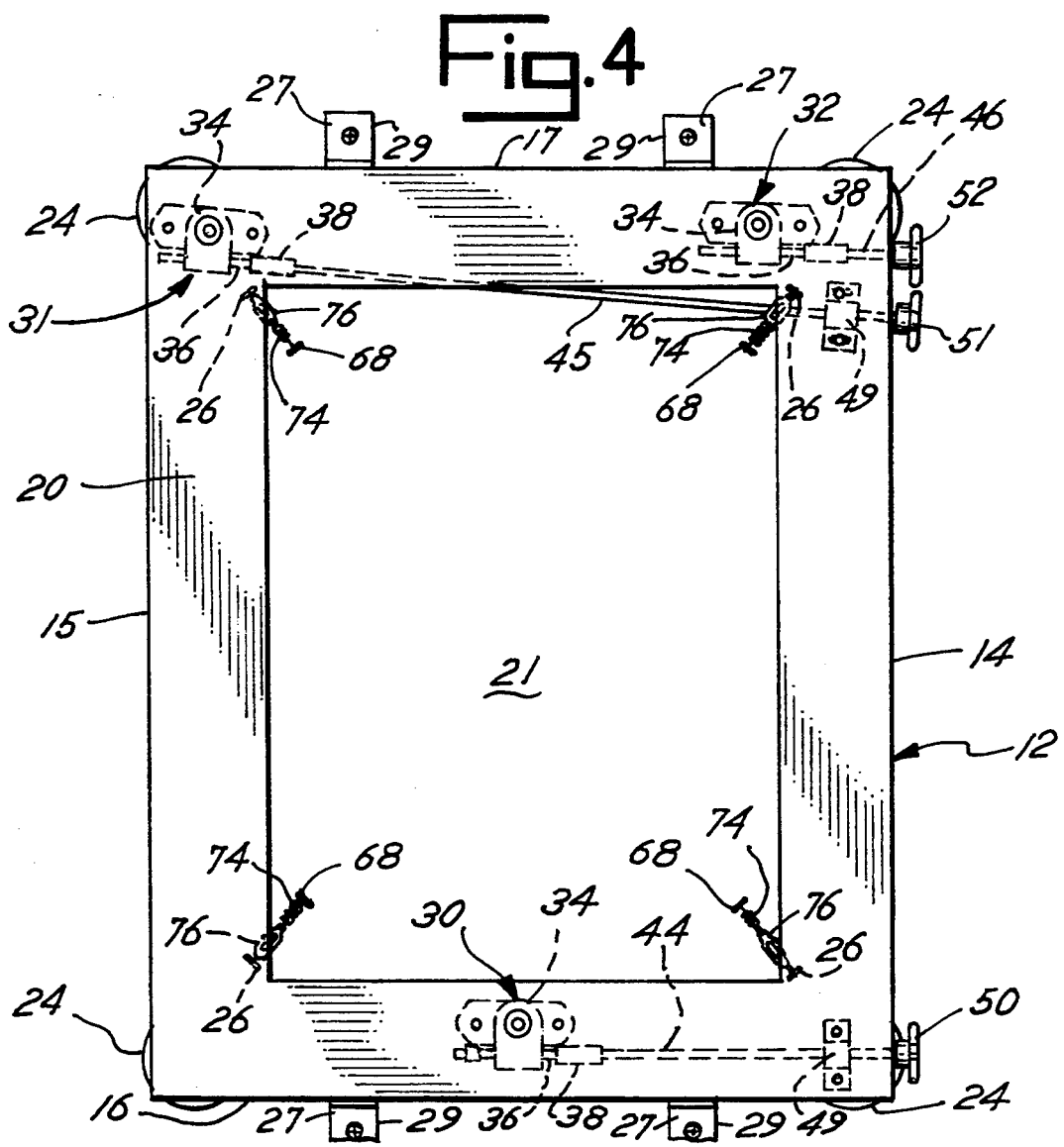

LEVELING APPARATUS FOR A LEVEL SENSITIVE DEVICE

This invention relates apparatus to a leveling apparatus for mobile X-ray processors and other level sensitive devices.

BACKGROUND OF INVENTION

Various mobile X-ray processors have been developed for mobile medical treatment vehicles. These treatment vehicles allow medical services to be transported to remote areas and needy communities. These medical treatment vehicles carry a variety of sensitive equipment. Conventional X-ray processors, like many other devices, are level sensitive. X-ray processors must be leveled at each location that the vehicle stops to allow the processor to operate properly. Conventional X-ray processors include adjustable leveling legs similar to common household appliances, such as washing machines. For use in mobile treatment vehicles, these processors are mounted to a countertop or other surface inside the vehicle. At each location, the leveling legs are hand adjusted to level the processor. Often, the hydraulic lifts of the treatment vehicle itself are often employed as a leveling system, rather than adjusting the individual legs of the processor. Mechanically lifting and adjusting the treatment vehicle in order to level the X-ray processor inside the vehicle is impractical and fails to provide the degree of precision required to level the conventional X-ray processors. Both methods were overly complicated, time-consuming and mechanically impractical.

Recently, a separate leveling apparatus of enclosed design has been developed for X-ray processors. These levelers use a tray and adjustable leveling pods to support and level the X-ray processors. Generally, these levelers were unstable during transportation because of the weight of the processors. The enclosed design and the weight of the processors also made servicing the levelers difficult.

SUMMARY OF INVENTION

This invention provides a separate leveling apparatus or leveler to adjust the level of an X-ray processor or other level sensitive device to eliminate the leveling problems of the prior art. The X-ray processor rests atop the leveler on an adjustable leveling tray mounted to a base. The height and position of the tray are adjusted by three leveling pods. The leveling pods are controlled from the front of the leveler by a set of three rotating handles. The leveler uses a set of four springs and turnbuckles to bias the tray against the leveling pods. The springs and turnbuckles provide improved stability to the leveler and processor during transportation and improve the sensitivity and accuracy of the leveling process. Three leveling sight glasses on the front and ends of the tray allow the user to level the tray and the processor quickly and easily. Because of the weight of the X-ray processor, the leveler must be serviceable without removing the leveled device. The leveler of this invention incorporates an open design to allow the leveling pods to be serviced through openings in the end walls of the base. The leveler also uses suction cups to secured the base to a countertop or other smooth surface.

Accordingly, an object of this invention is to provide a leveling apparatus for supporting and leveling level sensitive devices that can be easily and quickly adjusted.

Another object is to provide for a leveling apparatus that can be carried within a vehicle.

Another object is to provide for a leveling apparatus that can be easily serviced.

Another object is to provide for an apparatus for leveling a level sensitive device comprising a base, a tray spaced horizontally above the base and supported by a set of adjustable leveling pods carried by the base.

Other objects will become apparent upon a reading of the following description.

BRIEF DESCRIPTION OF THE DRAWINGS

A preferred embodiment of the invention has been depicted for illustrative purposes only wherein:

FIG. 1 is a front elevational view of the leveling apparatus of this(invention mounted on a countertop and supporting an X-ray processor;

FIG. 2 is a perspective view of the leveling apparatus of FIG. 1 with cutaway section revealing the internal components;

FIG. 3 is a left end view of the leveling apparatus of FIG. 1; and

FIG. 4 is a top view of the leveling apparatus of FIG. 3 taken along line 4—4 in FIG. 3.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize its teachings.

FIG. 1 shows the leveler 10 of this invention used with a conventional X-ray processor 2, such as Kodak Model 35. Leveler 10 of this invention can be used with any level sensitive device and is not limited to use with any particular type or embodiment of the level sensitive device. Leveler 10 is designed for use in a vehicle, which transports the various level sensitive devices; however, the applications of the leveling apparatus are not limited to use in vehicles and can be incorporated into any mobile or stationary application.

As show in the figures, leveler 10 includes a base 12 and a leveling tray 60 carried by base 12. Base 12 and tray 60 are constructed from a strong rigid material, preferably stainless steel. Base 12 includes side walls 14, 15, end walls 16, 17, connected by a top wall 20, and a floor 22. End walls 16, 17 define end openings 18, 19 into the interior 13 of base 12. Top wall 20 defines a central opening 21 into interior 13. Base floor 22 includes four turnbuckle loops 26 upwardly extending near each corner. A set of four suction cups 24 are attached beneath base floor 22 at each corner of base 12 by any conventional method. Suction cups 24 prevent leveler 10 from shifting on countertop 4 during the transportation. Additionally, four hold-down brackets 27 can be used to secure base 12 to countertop 4. Hold-down brackets 27 include a lip 28, which engages the end walls 16, 17 through openings 18, 19 and a leg part 29, which is attached to countertop 4 by any conventional method, such as screws.

Three vertical oriented leveling pods 30, 31 and 32 are mounted within interior 13 of base 12 in a triangular orientation by any conventional method, such as welds or bolts. Leveling pod 30 is mounted beneath top wall 20 at a central point along end wall 16. Leveling pods 31 and 32 are mounted beneath top wall 20 near opposite corners of end wall 17. Each leveling pod 30, 31 and 32 is of conventional design. Each leveling pod 30, 31 and 32 includes a body 34 housing a worm drive (not shown), a drive shaft 36, and a lift rod 40. Lift rod 40 each have a threaded lower end and terminate in a flat contact head 42 at its upper end. Drive shaft 36 extends from each leveling pod 30, 31 and 32 and is operatively associated with its worm gear. Each worm gear engages the threaded lower end of its lift rod 40. For each leveling pod 30, 31 and 32, drive shaft 36 rotates its worm gear to retract and extend lift rod 40 vertically from pod body 34. Each leveling pod 30, 31 and 32 is connected to an extension rod 44, 45 and 46 respectively. Couplings 38 mate extension rods 44, 45 and 46 to drive shafts 36 of each leveling pod 30, 31, and 32. Extension rods 44, 45 and 46 extend across interior 13 of base 12 through opening in side wall 14. Extension rods 44, 45 and 46 are supported by shaft bearings 48 and pillow blocks 49 mounted beneath top wall 20 and along side wall 14. Adjustment handles 50, 51 and 52 are fitted on the ends of extension rods 44, 45 and 46 which extend past side wall 14. As shown in FIGS. 1, 2 and 4, adjustment handle 50 is positioned at one end of side wall 14 and adjustment handles 51 and 52 are positioned in line at the opposite end of side wall 14.

Tray 60 includes a flat rectangular floor 62 with integral upturned sides 64, 65 and ends 66, 67. Tray floor 62 has a centrally positioned drain port 63 extending beneath tray floor 62. Tray 60 includes four spring loops 68 located beneath bottom 62 near each corner. Tray 60 also includes three cylindrical housings 69 mounted beneath tray 60 for accepting contact heads 42 of leveling pods 30, 31 and 32. Tray 60 carries three leveling sight glasses 70, 71 and 72. Sight glass 70 is carried by front side 64. Sight glasses 71 and 72 are carried on opposite ends 66 and 67 respectively. Each sight glass 70, 71 and 72 is in ready view of a user during adjustments of leveler 10.

Tray 60 rests upon contact heads 42 of leveling pods 30, 31 and 32 within cylindrical housings 69. A small amount of adhesive can be applied to the top of contact head 42 to secure tray 60 to contact head 42. Tray 60 is biased against contact heads 42 by a set of four springs 74 and turnbuckles 76 connected to base 12 and tray 60 extending upwardly through central opening 21. One end of each turnbuckle 76 is hooked though turnbuckle loop 26. One end of each spring 74 hooks through spring loops 68 beneath tray 60 with the other end connecting to the opposite end of turnbuckle 76. Turnbuckles 76 adjust the tension on springs 74.

Installed in a vehicle, leveler 10 is placed on a stable smooth stationary surface, such as a countertop 4. The location of leveler 10 should be at an appropriate height and position to allow ready access to both leveler 10 and processor 2. The weight of leveler 10 collapses suction cups 24. The vacuum created between suction cups 24 and countertop 4 generates a static force to prevent leveler 10 from shifting during transportation. Hold-down brackets 27 provide additional reinforcement to secure base 12 to countertop 4. A drain hose (not shown) can be connected to drain port 63 underneath tray 60. Drain port 63 allows any waste or overflow developing fluids from the processor to drain into a holding tank within the vehicle. Processor 2 is then set atop of tray 60. Generally, the adjustable leg bolts (not shown) of processor 2 are initially removed. The leg bolts can be replaced with hex bolts that extend through bores 61 in floor 62 to secure processor 2 to tray 60. The combined weight of leveler 10 and processor 2 and the grip action of suction cups 24 provide sufficient static surface tension to prevent leveler 10 from shifting during transportation.

Leveler 10 must be adjusted to level before operating processor 2 at each stop location of the vehicle. Sight glasses 70, 71 and 72 provide an initial indication of the processor's relation to a level position. The operator adjusts leveling pods 30, 31 and 32 by rotating handles 50, 51 and 52 until sight glasses 70, 71 and 72 indicate a level position. Handles 50, 51 and 52 can be rotated clockwise or counterclockwise to either raise or lower lift rods 40 of each leveling pod 30, 31 and 32. The triangular position of leveling pods 30, 31 and 32 provide a three point level plane adjustment. Handle 50 and leveling pod 30 raise and lower end 66. Handle 51 and leveling pod 31 raise and lower the corner of tray 60 formed by side 65 and end 67. Handle 52 and leveling pod 32 raise and lower the corner of tray 60 formed by side 64 and end 67.

It is understood that the above description does not limit the invention to the details given, but may be modified within the scope of the following claims.

I claim:

1. An apparatus for leveling a level sensitive device comprising:

a base including side walls and end walls, tray means spaced vertically above said base, means mounted to said base and engaging said tray means for leveling said tray means relative to said base, means carried by one of said side walls for actuating said leveling means, and spring means connected between said tray means and said base means for biasing said tray means against said leveling means.

2. The leveling apparatus of claim 1 wherein said tray means includes a substantially horizontal tray with upturned edges, said level sensitive device seated atop said tray.

3. The leveling apparatus of claim 1 wherein said leveling means comprises three leveling pods disposed within said base in a triangular orientation, each leveling pod including a vertically extensible lift rod and a drive shaft, said lift rod engaging said tray means and being responsive to rotation of said drive shaft.

4. The leveling apparatus of claim 3 wherein said actuator means includes for each leveling pod an operatively connected handle part, wherein rotation of the rod and its connected handle part in one direction turns the drive shaft to vertically extend said lift rod from the associated leveling pod, wherein rotation of the rod and its connected handle part in the opposite direction turns the drive shaft to vertically retract the lift rod into the associated leveling pod, each handle part disposed adjacent said one side wall.

5. The leveling apparatus of claim 4 wherein said actuating means comprises a rod associated with each said leveling pod, said rod extending through said one side wall, said rod connected at one end to said drive shaft and at the other to said handle part.

6. The leveler of claim 1 wherein said spring means includes a spring connected at one end to said base and at the other end to said tray.

7. The leveler of claim 6 wherein said spring means further includes a turnbuckle connected to said base and to said spring other end.

8. The leveling apparatus of claim 1 wherein each said end wall includes an end opening.

9. A leveling apparatus for leveling a level sensitive device and carried atop a substantially flat surface, said leveling apparatus comprising:
a base mounted to said surface including side and end walls, tray means spaced vertically above said base, means connected to said base and engaging said tray means for leveling the position of said tray means relative to said base, means carried by one of said side walls for actuating said leveling means, spring means connected to said tray and said base for biasing said tray means against said leveling means, and means for securing said base to said surface.

10. The leveling apparatus of claim 9 wherein said securing means includes a suction cup attached to an undersurface of said base.

11. The leveling apparatus of claim 9 wherein said tray means includes a substantially horizontal tray with upturned edges.

12. The leveling apparatus of claim 9 wherein said leveling means comprises three leveling pods disposed within said base in a triangular orientation, each leveling pod including a vertically extensible lift rod and a drive shaft, said lift rod engaging said tray means and being responsive to rotation of said shaft.

13. The leveling apparatus of claim 12 wherein said actuator means includes for each leveling pod an operatively connected handle part, wherein rotation of the rod and its connected handle part in one direction turns the drive shaft to vertically extend said lift rod from the associated leveling pod, wherein rotation of the rod and its connected handle part in the opposite direction turns the drive shaft to vertically retract the lift rod into the associated leveling pod, each handle part disposed adjacent said one side wall.

14. The leveling apparatus of claim 13 wherein said actuating means comprises a rod associated with each said leveling pod, said rod extending through said one side wall, said rod connected at one end to said drive shaft and at the other to said handle part.

15. The leveler of claim 9 wherein said spring means includes a spring connected at one end to said base and at the other end to said tray.

16. The leveler of claim 15 wherein said spring means further includes a turnbuckle connected to said base and to said spring other end.

17. The leveling apparatus of claim 9 wherein each said end wall includes an end opening.

18. A leveling apparatus carried atop a substantially flat surface for leveling a level sensitive device comprising:
a base including side walls and end walls,
a tray spaced vertically above said base,
three leveling pods disposed within said base in a triangular orientation, each leveling pod including a vertically extensible lift rod operatively connected to said tray and a drive shaft, said lift rod engaging said tray means and being responsive to rotation of said drive shaft,
a rotatable handle part operatively connected to said drive shaft of each leveling pod, and
a spring connected at one end to said base and at the other end to said tray.

19. The leveling apparatus of claim 18 further comprising a rotatable rod connected between the handle part and drive shaft of each leveling pod.

20. The leveling apparatus of claim 18 wherein said tray includes up-turned edges.

21. The leveling apparatus of claim 18 further comprising a turnbuckle interconnecting said base and said spring one end.

22. The leveling apparatus of claim 18 wherein each said end wall includes an end opening.

23. The leveling apparatus of claim 18 further comprising a suction cup attached to an undersurface of said base.

* * * * *